(12) United States Patent
Miya et al.

(10) Patent No.: US 6,876,120 B2
(45) Date of Patent: Apr. 5, 2005

(54) INNER CORE STRUCTURE OF A ROTARY TRANSFORMER-TYPE RESOLVER

(75) Inventors: Taiichi Miya, Tokyo (JP); Mutsumi Matsuura, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/681,368

(22) Filed: Oct. 9, 2003

(65) Prior Publication Data

US 2004/0145264 A1 Jul. 29, 2004

(30) Foreign Application Priority Data

Oct. 9, 2002 (JP) ........................................ 2002-296457

(51) Int. Cl.$^7$ ............................ H02K 24/00; H02K 3/50
(52) U.S. Cl. ....................... 310/216; 310/159; 310/171; 323/348; 336/120
(58) Field of Search ................................ 310/159, 161, 310/166, 168, 171, 179, 68 B, 216; 336/120; 323/348

(56) References Cited

U.S. PATENT DOCUMENTS

| | | | |
|---|---|---|---|
| 3,591,732 A | * 7/1971 | Prochnow | 360/281.2 |
| 3,736,449 A | * 5/1973 | Honeywell et al. | 310/171 |
| 4,041,541 A | * 8/1977 | Frossard et al. | 361/27 |
| 4,096,535 A | * 6/1978 | Highnote | 360/84 |
| 5,191,309 A | * 3/1993 | Laros | 336/120 |
| 5,347,256 A | * 9/1994 | Yumiki et al. | 336/84 C |
| 5,677,661 A | * 10/1997 | Jang | 336/120 |
| 5,705,872 A | * 1/1998 | Loge | 310/161 |
| 6,037,690 A | * 3/2000 | Hill | 310/168 |
| 6,038,761 A | 3/2000 | Meiler et al. | |
| 6,118,201 A | 9/2000 | Dulin et al. | |
| 6,608,473 B2 | * 8/2003 | Beulich | 323/348 |

FOREIGN PATENT DOCUMENTS

| | | | |
|---|---|---|---|
| EP | 0 452 551 B1 | 12/1990 | |
| EP | 0 593 351 A1 | 10/1993 | |
| EP | 0 8279424 | 10/1996 | |
| EP | 809345 A1 | * 11/1997 | H02K/24/00 |
| EP | 10170306 | 6/1998 | |
| GB | 1 347 484 | 7/1970 | |
| JP | A-H8-279424 | 10/1996 | |
| JP | 10309066 A | * 11/1998 | H02K/24/00 |

* cited by examiner

Primary Examiner—Burton Mullins
(74) Attorney, Agent, or Firm—Adduci, Mastriani & Schaumberg, L.L.P.

(57) ABSTRACT

An inner core 62 and a resolver rotor 63 are secured to a rotary shaft 68 so that they are coaxial. A spacer 2, is provided between the inner core 62 and the resolver rotor 63. The spacer 2 and the inner core 62 are formed as a unit with separation, or space, between the spacer 2 and flange 41 of the inner core 62. The thickness of flange 41 is greater than the corresponding width of the corresponding part of the outer core, on which a rotary transformer input winding is wound. The resolver rotor 63 is a separate unit from the spacer 2 and the inner core 62, which facilitates automatic winding of the rotor. Grooves 3, 42 are formed in the spacer 2 and the flange 41 to accommodate a crossover wire 60.

13 Claims, 4 Drawing Sheets

INNER CORE STRUCTURE OF A ROTARY TRANSFORMER-TYPE RESOLVER

CROSS REFERENCE TO RELATED APPLICATION

This application is based on and incorporates by reference Japanese Patent Application No. 2002-296457, which was filed on 9 Oct. 2002.

BACKGROUND OF THE INVENTION

The present invention relates to an inner core structure of a rotary transformer-type resolver and, more particularly, to an inner core structure of a resolver that permits separation of a resolver rotor to permit automatic winding of the resolver rotor.

As shown in FIG. 11, a typical resolver rotor was constructed by pieces in which only a rotor body 52 was layered and press-worked. FIG. 6 is derived from Japanese Unexamined Patent Application Publication H8-279424. For the bushing 53 and transformer body 54, cutting from round bars was performed, and final finishing of the outer diameter of the entire rotor was performed by machining. Because the bushing 53 and the transformer body 54 are machined from round bars, the outer diameter of the entire rotor assembly is highly processed. After the rotor body 52 and transformer body 54 were bonded to a shaft 51, machining of the outer diameter of the entire rotor assembly was required. Thus, with the assembly of FIG. 6, it is extremely difficult to reduce costs and to automate manufacturing.

In order to solve these problems, as shown in FIG. 7, which is derived from Japanese Unexamined Patent Application Publication H8-279424, a rotor assembly was developed that included a layered rotor body 200, a layered bushing 300 and a layered transformer body 400. The layered parts were all formed by layering press-worked pieces on a shaft 100, and the respective layered parts were fastened together by means of a crimping portion 500 formed at the end of the shaft 100. This reduces the amount of machining required and reduces costs.

However, the rotor assembly shown in FIG. 7 is such that the layered rotor body 200, the layered bushing 300 and the layered transformer body 400 are formed as a unit, so when an attempt is made to use an automatic winding machine to wind the excitation windings to the layered rotor body 200, the layered transformer body 400 becomes an obstruction, and it is difficult or impossible to use an automatic winding machine. Alternatively, a special jig may be required for automatic winding.

SUMMARY OF THE INVENTION

An object of the invention is to provide an inner core structure of a resolver that facilitates automatic winding of the rotor of the resolver.

Another object of the invention is to reduce manufacturing costs by making a resolver inner core structure with pressed and layered metal sheets.

Basically, the present invention is a rotary transformer-type resolver that includes an inner core. The inner core is adapted to receive a rotary shaft. A rotary transformer output winding is wound on the inner core. The resolver includes a resolver rotor, on which resolver excitation windings are wound. The rotor is adapted to be secured to the rotary shaft, so that the inner core and the rotor are coaxial. The inner core includes at least one flange, which is located between the rotary transformer output winding and the rotor. A spacer is located between the flange and the rotor. A fixing groove, into which is fitted a crossover that connects the rotary transformer output winding and the resolver excitation windings, is formed in the spacer. A cutout groove, which accommodates the crossover, is formed in the flange. The spacer and the inner core are formed as a unit with a separation, or space, between the spacer and the flange.

In another aspect of the invention, the resolver includes an outer core, on which stator transformer windings are located. The width of the flange, in which the cutout groove is formed, is greater in the axial direction than that of a corresponding part of the outer core.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

Figure 1:
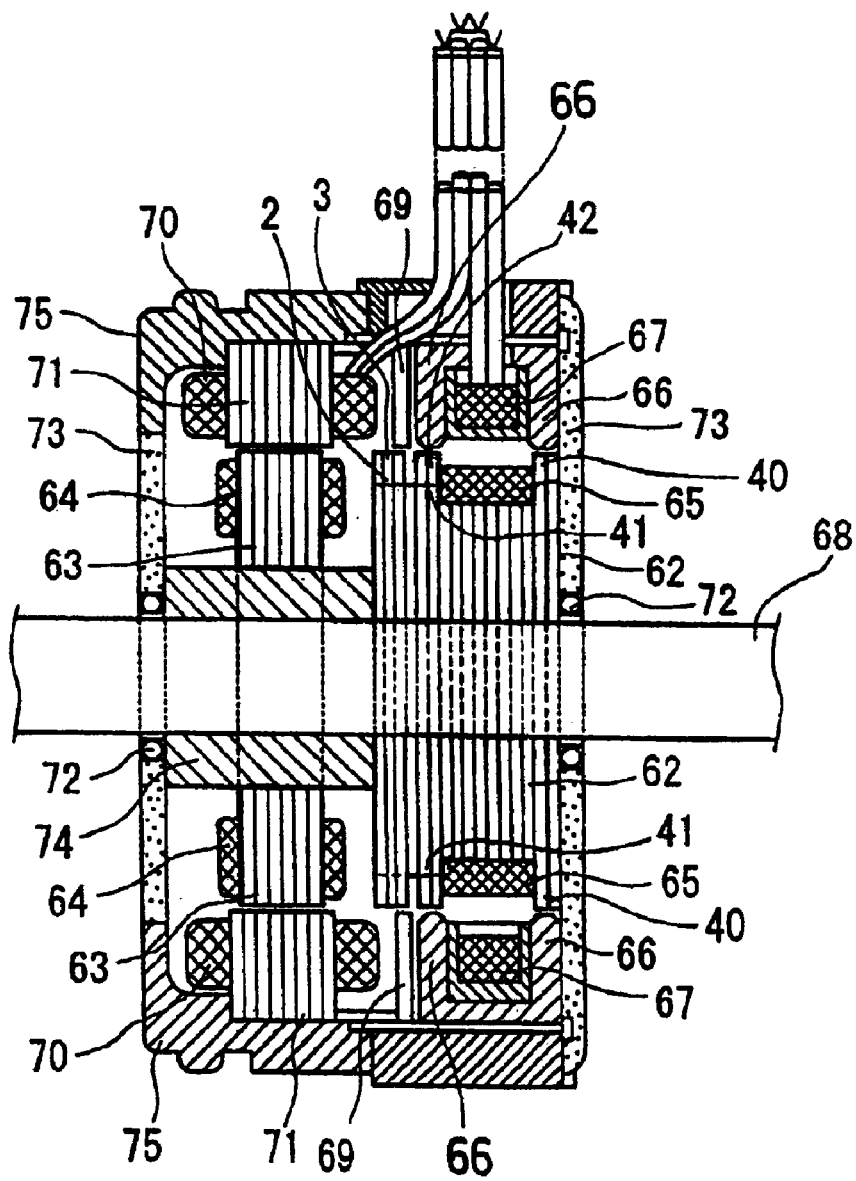
FIG. 1 is a partial cross sectional view that shows one embodiment of the inner core structure of the present invention.
Figure 2:
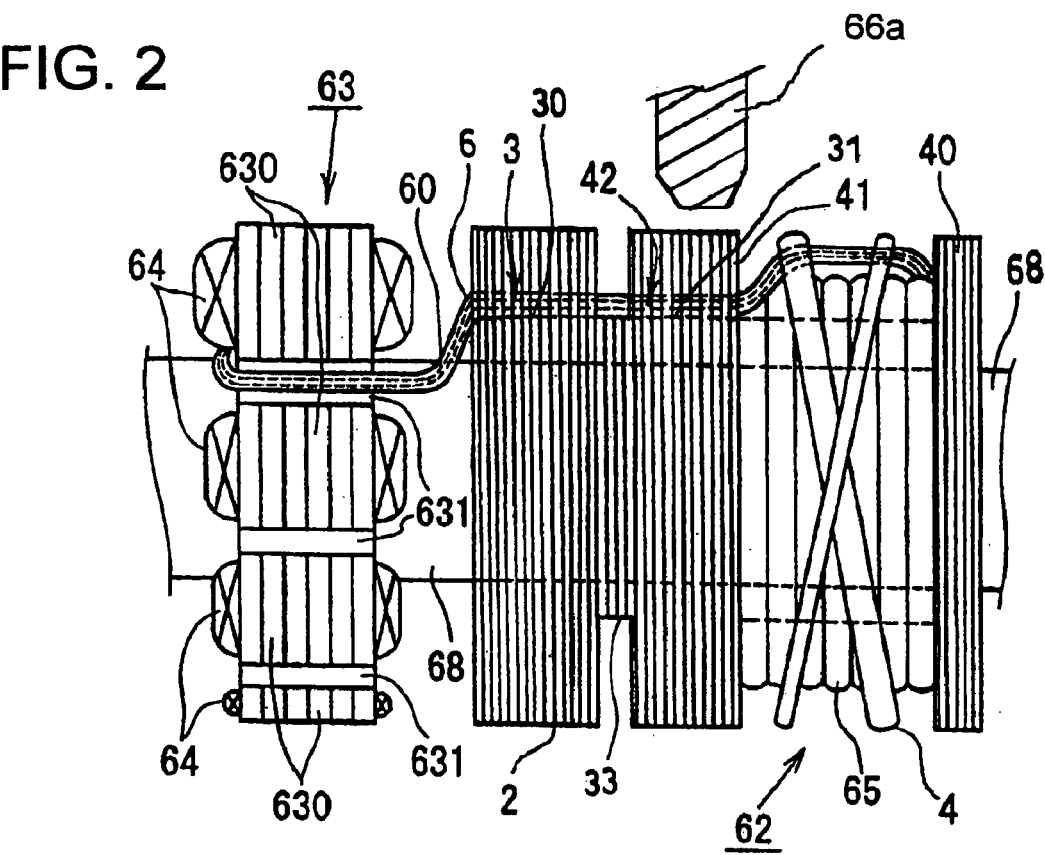
FIG. 2 is an enlarged side view of the inner core, the resolver rotor, and the spacer of FIG. 1.
Figure 3:
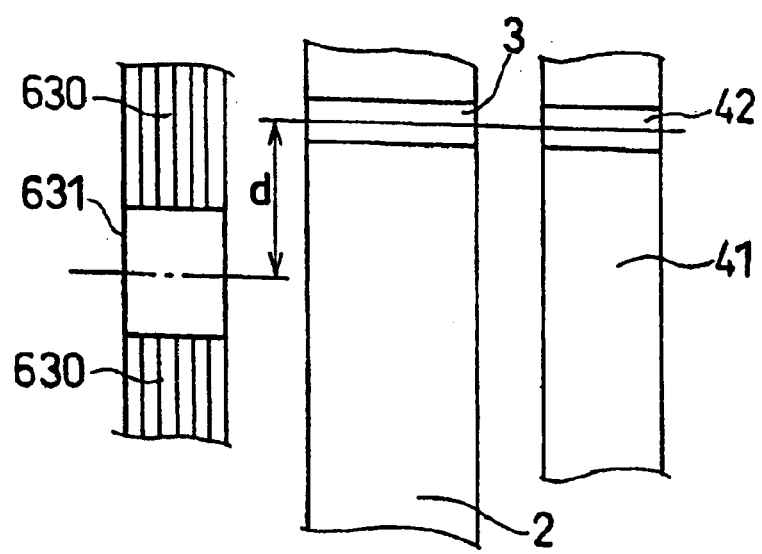
FIG. 3 is partial diagrammatic top view that shows a relationship between a fixing groove, into which a crossover is set, and the inter-magnet space of the magnets of the resolver rotor.

Referring to FIGS. 1–3, a resolver portion and a rotary transformer are provided within a ring-shaped case 75. A resolver stator 71, which has resolver stator windings 70, and an outer core 66, which has stator transformer windings 67 are located adjacent to one another on the case 75. A shield plate 69, which shields against leakage of magnetic flux from an inner core 62, is oriented radially between the resolver stator 71 and the outer core 66 as shown in FIG. 1. The shield plate 69 may be omitted, depending on the particular conditions of use.

In addition, a resolver rotor 63, which has resolver excitation windings 64, and an inner core 62, which has a rotary transformer output winding 65, are adjacent to one another on a rotary shaft 68. The rotary shaft 68 can rotate freely inside the case 75. Supplying current and inputting and outputting signals with respect to the resolver excitation windings 64 are performed via the rotary transformer output winding 65. The resolver stator 71, the resolver rotor 63, the inner core 62 and the outer core 66 are all made by layering silicon steel plates. The outer core 66 stops at the case 75 as shown. The resolver excitation windings 64 are mutually connected to the rotary transformer output winding 65.

The rotary shaft 68 is rotatably supported by a cover 73 with bearings 72. The cover 73 is fixed to the case 75 by bonding or fasteners, such as screws. The inner core 62 is equipped with flanges 40, 41, on which the rotary transformer output winding 65 is wound, and a cutout groove 42, which accommodates the rotary transformer output winding 65. A spacer 2 is provided on the rotary shaft 68 between the inner core 62 and the resolver rotor 63. The spacer 2 is formed by layering silicon steel plates. The spacer 2 and the resolver rotor 63 engage with a shaft holder 74 and are secured to the rotary shaft 68.

A fixing groove 3, which secures a crossover 60 (See FIG. 2) for connecting the rotary transformer output winding 65 and the resolver excitation windings 64, is formed in the spacer 2. The crossover 60 is covered with an insulating tube 6, is placed in the fixing groove 3, and is secured to the spacer 2. The crossover 60 may be additionally secured with varnish, during varnish impregnation of the rotary transformer output winding 65, for example. Alternatively, the crossover 60 may be secured to the spacer 2 with another bonding material. As a result, the crossover 60, which has been covered with the insulating tube 6, is secured to the rotary shaft 68 so that the crossover 60 cannot become loose, disconnect, or short circuit due to vibration.

FIG. 2 illustrates the inner core structure of the resolver. FIG. 2 is an enlarged view of the inner core 62, the resolver rotor 63 and the spacer 2 of FIG. 1. The rotary transformer output winding 65 is wound around the inner core 62 and is secured to the rotary shaft 68 along with the crossover 60, which has been covered with the insulating tube 6, by means of a cord 4. The crossover 60 may be secured, along with the rotary transformer output winding 65, by varnish impregnation instead of using the cord 4. The resolver excitation windings 64 are respectively wound on the plurality of rotor magnets 630 at the resolver rotor 63. Inter-magnet spaces 631 are formed between the rotor magnets 630. The inner core 62, the resolver rotor 63 and the spacer 2 are respectively secured to the rotary shaft 68. At the inner core 62, a cutout groove 42, which accommodates the crossover 60, is formed on the flange 41 that is nearest to the spacer 2. The fixing groove 3 and the cutout groove 42 are aligned in the axial direction of the rotary shaft 68, which facilitates soldering of the rotary transformer output winding 65 and the resolver excitation windings 64.

The inner core 62 and the spacer 2 are formed as a unit by layering a plurality of silicon steel plates. Also, as shown in FIG. 2, the width (measured in the axial direction) of the flange 41, in which the cutout groove 42 is formed, is greater than the corresponding width of the corresponding part 66a of outer core 66, on which the rotary transformer input winding is wound. As a result, the magnetic bond of the outer core 66 and the inner core 62 becomes close, resolver performance improves, and the effects of the magnetic flux of the rotary transformer with respect to the resolver stator 71 and the resolver rotor 63 are reduced.

There is separation section 33 between the spacer 2 and the flange 41 of the inner core 62, and the radius, as measured from the axis of the shaft 68, of the separation section 33 is the same as that of the inner surfaces 30, 31 of the fixing groove 3 and the cutout groove 42, respectively. For this reason, the crossover 60 comes into contact with the outer surface of the separation section 33 when it is fitted into the fixing groove 3 and the cutout groove 42. As a result, bending of the insulating tube 6 is eliminated, and varnish impregnation becomes easier, and, even under severe usage conditions, nonconformities by which the crossover may become loose, disconnected, or short circuited, do not occur.

The separation section 33 is formed by reducing the diameter of at least one of the metal plates of the lamination, or stack, as shown in FIG. 2.

The soldered rotary transformer output winding 65 and resolver excitation windings 64 are covered with insulating tubing 6, and the crossover 60 is formed. The crossover 60, which has been covered with the insulating tubing 6, is fitted into the fixing groove 3, which is formed in the stator 2. The fixing groove 3 and the cutout groove 42 are aligned in the axial direction of the rotary shaft 68 as shown in FIG. 3, but the fixing groove 3 and the inter-magnet space 631 are misaligned, or offset, in the circumferential direction. That is, if the distance between the respective centers of the fixing groove 3 and the inter-magnet space 631 is considered to be d, then d>0, and the distance d is such that stress resulting from misalignment of the respective centers of the fixing groove 3 and the inter-magnet space 631 is applied to the insulating tube 6, and a frictional force occurs between the insulating tube 6 and the fixing groove 3 due to the stress. For this reason, the position of the crossover 60 cannot change, and the crossover 60 cannot escape from the fixing groove 3.

Figure 4:
FIGS. 4, 5, and 6 are perspective diagrams that show various embodiments of the fixing groove (or grooves) of the spacer of the present invention.
Figure 5:
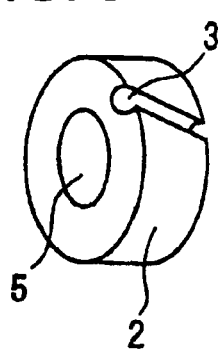
Figure 6:
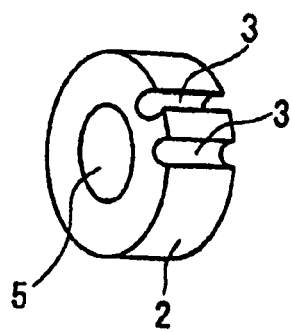

As shown in FIGS. 3 and 4, the axes of the fixing groove 3 and cutout groove 42 may be parallel to the rotary shaft 68. Alternatively, the axis of the fixing groove 3 may be inclined in either direction with respect to the axis of the shaft 68, as shown in FIG. 5. Also, there may be a plurality of fixing grooves 3, as shown in FIG. 6. In any case, the fixing groove 3 and the inter-magnet space 631 are offset in the circumferential direction in the manner illustrated in FIG. 3. In a case where there is a plurality of fixing grooves 3 and a plurality of cutout grooves 42, different resolver excitation windings 64 are fitted into the respective fixing grooves, and the respective fixing grooves 3 and cutout grooves 42 are offset in the circumferential direction with respect to the inter-magnet spaces 631. In this way, if there is a plurality of fixing grooves 3 and cutout grooves 42, the respective windings of the resolver excitation windings 64 can be accommodated separately. As a result, damage resulting from contact between windings is prevented, and the mutual dielectric strength is improved.

Figure 7:
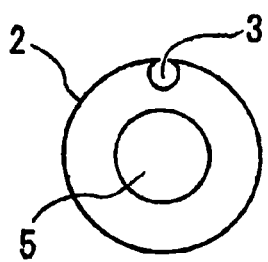
FIGS. 7, 8, 9 and 10 are perspective diagrams that show various embodiments of the spacer of the present invention.
Figure 8:
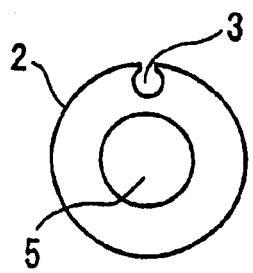
Figure 9:
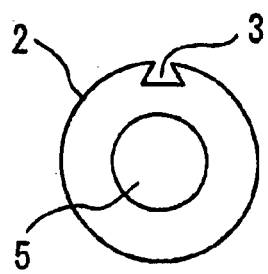
Figure 10:
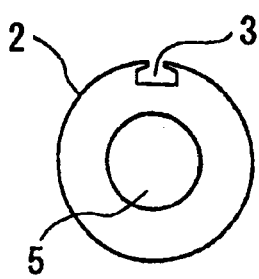
Figure 11:
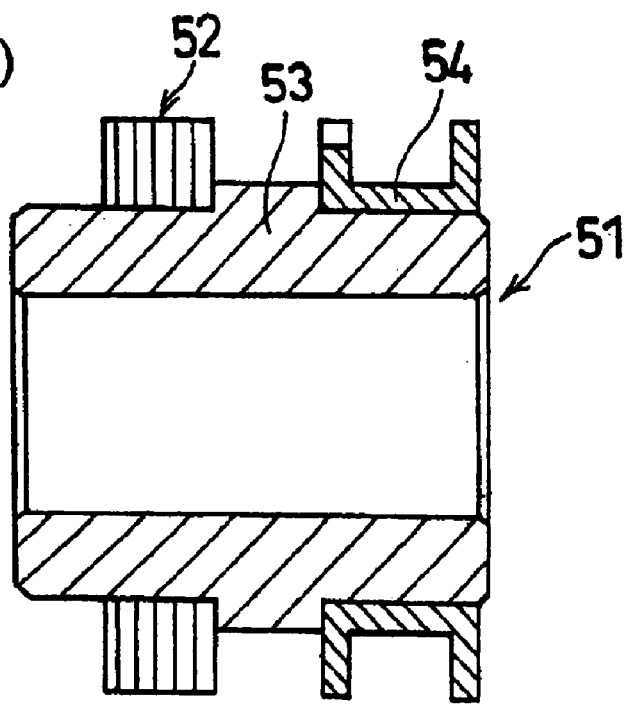
FIG. 11 is a partial cross-sectional view that shows a conventional resolver.
Figure 12:
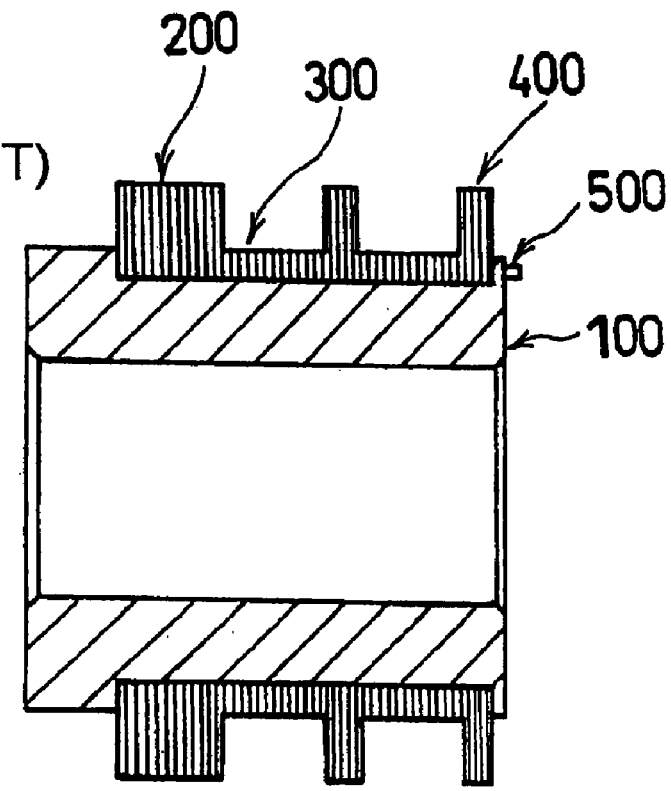
FIG. 12 is a partial cross-sectional view that shows another conventional resolver.

As shown in FIG. 7, the cross-sectional shape of the aforementioned fixing groove 3 (and cutout groove 42) may be a nearly complete circle that is approximately tangential with the perimeter of the spacer 2 and formed at a position near the surface. Alternatively, as shown in FIG. 8, the fixing groove 3 (and the cutout groove 42) may have the shape of a near circle that is spaced radially inward from the surface of the spacer with a narrow aperture facing radially outward. Further, the fixing groove 3 (and the cutout groove 42) may have a trapezoidal shape (FIG. 9), or a nearly pentagonal shape (FIG. 10). By making the aperture narrow as shown in FIGS. 7–10, the crossover 60 (and the insulating tube 6) cannot escape from the fixing groove 3 (and the cutout groove 42). In FIGS. 4–10, the central hole accommodates the rotary shaft 68. Although FIGS. 4–10 do not show the cutout groove 42, it is understood that the cutout groove 42 may have the same configuration as the fixing groove 3.

By forming the inner core 62 and the spacer 2 as a unitary structure, or lamination, with a separation, or space, between the spacer 2 and the flange 41 that is nearest to the spacer 2, the spacer 2 does not affect the resolver stator 71 with magnetic flux. Manufacturing costs are reduced by forming the spacer 2 and the inner core 62 as a unit. Furthermore, the resolver rotor 63 is separated, and the inner core is not an obstruction to automatic winding of the rotor.

By forming the unitary structure of the inner core 62 and the spacer 2 with a lamination of metal plates, little or no machining is required, which reduces manufacturing costs.

Since the width (as measured in the axial direction) of the flange 41, in which the cutout groove 42 is formed is greater than the corresponding width (measured in the axial direction) of a corresponding part 66a of the outer core 66, on which the rotary transformer input winding 67 is wound, the magnetic bond of the outer core 66 and the inner core 62 becomes close. Accordingly, resolver performance improves, and the effects of the magnetic flux of the rotary transformer with respect to the resolver stator and the resolver rotor are also reduced.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A rotary transformer-type resolver comprising:
   an inner core on which a rotary transformer output winding is wound, wherein the inner core is adapted to receive a rotary shaft;
   a resolver rotor on which resolver excitation windings are wound;
   a spacer, which is located between the inner core and the resolver rotor, wherein a fixing groove is formed in the spacer, and a crossover, which connects said rotary transformer output winding and said resolver excitation windings, extends between said inner core and said resolver rotor and is accommodated by the fixing groove;
   a flange formed on the inner core between the spacer and the rotary transformer output winding, wherein a cutout groove, which accommodates the crossover, is formed in the flange, and wherein the cutout groove and the fixing groove are aligned in the axial direction of the resolver, and wherein the spacer and the inner core are formed as a unit, and a space, which extends in the axial direction, is formed between the spacer and the flange.

2. The rotary transformer-type resolver according to claim 1, wherein an outer core, on which a rotary transformer input winding is wound, is located radially outward of the inner core, and the axial dimension of the flange is greater than the corresponding axial dimension of a corresponding part of the outer core.

3. The rotary transformer-type resolver according to claim 1, wherein the inner core and the spacer are formed by a lamination of metal plates.

4. The rotary transformer-type resolver according to claim 3, wherein at least one metal plate of the lamination has a smaller diameter than metal plates of the lamination that form the flange and the spacer to create the space.

5. A rotary transformer-type resolver comprising:
   an inner core on which a rotary transformer output winding is wound, wherein the inner core is adapted to be secured to a rotary shaft;
   a resolver rotor on which resolver excitation windings are wound, wherein the rotor is separated from the inner core in the axial direction of the resolver;
   a spacer, which is located between the inner core and the resolver rotor, wherein the spacer and the inner core are part of a unitary structure;
   a flange formed on the inner core between the spacer and the rotary transformer output winding, wherein a space is formed, which extends in the axial direction of the resolver, between the spacer and the flange.

6. The rotary transformer-type resolver according to claim 5, wherein an outer core, on which a rotary transformer input winding is wound, is located radially outward of the inner core, and the axial dimension of the flange is greater than the corresponding axial dimension of a corresponding part of the outer core.

7. The rotary transformer-type resolver according to claim 5, wherein the inner core and the spacer are formed by a lamination of metal plates.

8. The rotary transformer-type resolver according to claim 7, wherein at least one metal plate of the lamination has a smaller diameter than metal plates of the lamination that form the flange and the spacer to create the space.

9. The rotary transformer-type resolver according to claim 5, wherein:
   a crossover wire connects the rotary transformer output winding and the resolver excitation windings;
   a fixing groove is formed in the spacer;
   a cutout groove is formed in the flange; and
   the crossover wire is fitted in the fixing groove and the cutout groove.

10. A rotary transformer-type resolver comprising:
    an inner core on which a rotary transformer output winding is wound, wherein the inner core is adapted to be secured to a rotary shaft;
    a resolver rotor on which resolver excitation windings are wound, wherein the rotor is separated from the inner core in the axial direction of the resolver;
    a spacer, which is located between the inner core and the resolver rotor, wherein the spacer and the inner core are part of a unitary structure that is formed by a lamination of metal plates;
    a flange formed on the inner core between the spacer and the rotary transformer output winding, wherein a space is formed, which extends in the axial direction of the resolver, between the spacer and the flange; and
    a crossover wire, which connects the rotary transformer output winding and the resolver excitation windings.

11. The rotary transformer-type resolver according to claim 10, wherein an outer core, on which a rotary transformer input winding is wound, is located radially outward of the inner core, and the axial dimension of the flange is greater than the corresponding axial dimension of a corresponding part of the outer core.

12. The rotary transformer-type resolver according to claim 10, wherein at least one metal plate of the lamination has a smaller diameter than metal plates of the lamination that form the flange and the spacer to create the space.

13. The rotary transformer-type resolver according to claim 10, wherein:
    a fixing groove is formed in the spacer;
    a cutout groove is formed in the flange; and
    the crossover wire is fitted in the fixing groove and the cutout groove.

* * * * *